United States Patent [19]

Howell

[11] Patent Number: 5,015,072
[45] Date of Patent: May 14, 1991

[54] GLARE REDUCTION SHIELD
[75] Inventor: Jesse A. Howell, Charlottesville, Va.
[73] Assignee: Sperry Marine Inc., Charlottesville, Va.
[21] Appl. No.: 445,590
[22] Filed: Nov. 29, 1989
[51] Int. Cl.5 ............................................. G02B 27/00
[52] U.S. Cl. .............................. 350/276 R; 350/399; 358/252
[58] Field of Search ............. 350/276 R, 276 SL, 284, 350/399; 358/247, 249, 250, 252, 253

[56] References Cited

U.S. PATENT DOCUMENTS 3,109,063 10/1963 Parker .................................. 350/399
4,668,026 5/1987 Lapeyre et al. ................. 350/276 R
4,863,242 9/1989 Correa ........................... 350/276 R Primary Examiner—Paul M. Dzierzynski
Assistant Examiner—Loha Ben
Attorney, Agent, or Firm—Seymour Levine

[57] ABSTRACT

A glare reducing shield usable with a touchscreen display includes a shade positioned above the display and a circular polarizer mounted within the shade and above touch-screen display. The circular polarizer is mounted at a height sufficient to permit activation of touch finger control functions on the touch-screen display. Reflections from the circular polarizer are reduced by shaping the circular polarizer to direct light reflected therefrom to light absorbing material coating the inner surfaces of the hood.

9 Claims, 2 Drawing Sheets

GLARE REDUCTION SHIELD

BACKGROUND OF THE INVENTION

1. Field of the Invention

The invention pertains to the field of surface glare reduction, and more particularly, to the reduction of glare from cathode ray tube or touchscreen radar displays.

2. Description of the Prior Art

The glare of from a phosphor surface display in a well lit area creates a poor contrast ratio thereby adversely affecting the visual detail observable on the display.

One method in the prior art for reducing glare is to position a reflectionless coating on the surface of the display. Such a coating, however, affects the image quality and, in many cases, does not justify the increased cost involved. Additionally, this approach is not feasible for the reduction of glare from a touchscreen display, whereon control functions for a system are display on the screen and activated by a touch of the finger. This coating significantly reduces the sensitivity of the touchscreen to the finger touch, thereby preventing a control activation by the touch of a finger. Further, fingerprints are highly visible on this coating, thus adversely effecting the detection of small targets or other small display entries.

Other methods of reducing glare in the prior art utilize a shield positioned over the display surface and tilting the display so that light reflected therefrom is incident to the inner surface of the shield. This inner surface has a nonreflection coating applied thereto so that light is not reflected therefrom. Two purposes are served by this shield, it shields the display surface from light that is incident thereto at angles within a broad angular range and absorbs reflections from the display surface of light that is not intercepted by the shield. A shield of this type is disclosed in U.S. Pat. No. 4,032,222. For many applications, the viewing area required dictates a shield that intercepts only a small portion of the incident light. In these situations the display surface must be tilted at an angle, to reflect light incident to the display surface to the inner surface of the shield, that provides an unacceptable image foreshortening to the viewer of the display.

SUMMARY OF THE INVENTION

In accordance with the principles of the invention, glare reduction is accomplished with the combination of a light shield and a circular polarizer positioned within the shield at a sufficient height above the display surface to allow an operator hand access to the surface for finger touching control functions on the touchscreen. Light reflected from the display surface is blocked by the polarizer, while light reflected from the polarizer itself is absored by reflectionless coatings on then inner surface of the shield. Thus significant glare reduction is accomplished without adversely affecting the image as seen by the Operator and the sensitivity of the touchscreen to a finger touch.

DESCRIPTION OF THE PREFERRED EMBODIMENTS

Figure 1:
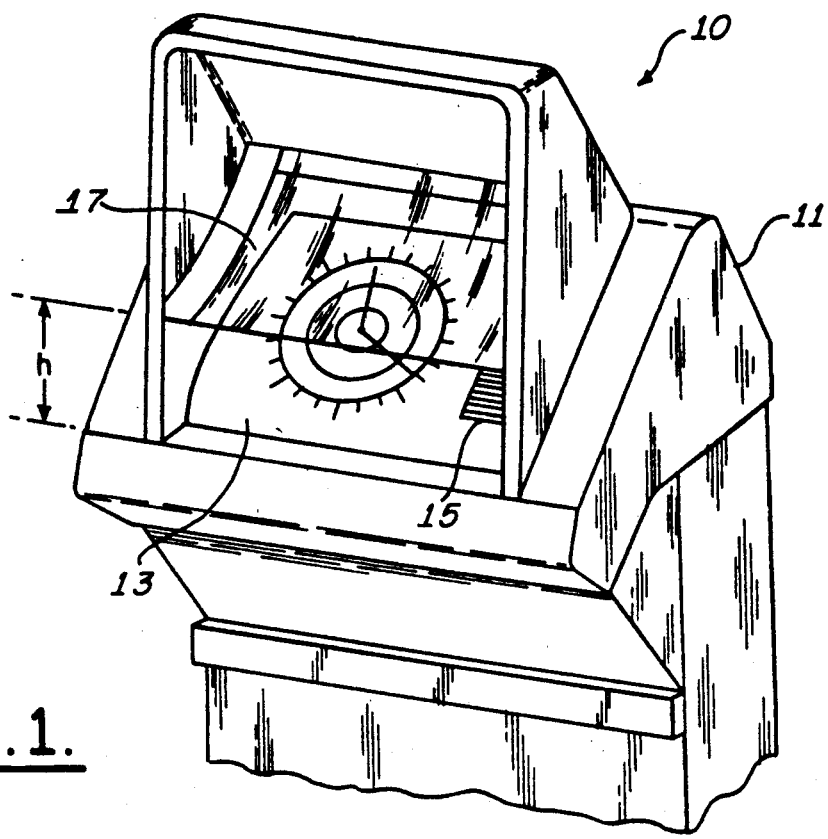
FIG. 1 is sketch of the glare reduction shield mounted on a radar display.

FIG. 1 is a representation of the glare reduction shield 10, which comprises the invention, mounted on a console 11 to shield a touchscreen displaying having touch senstive control functions 15. A glare reduction plate 17, to be described subsequently, is mounted at a height h above the touch screen dispaly 13 to permit access of an Operator's fingers to the touch control functions 15.

Figure 2:
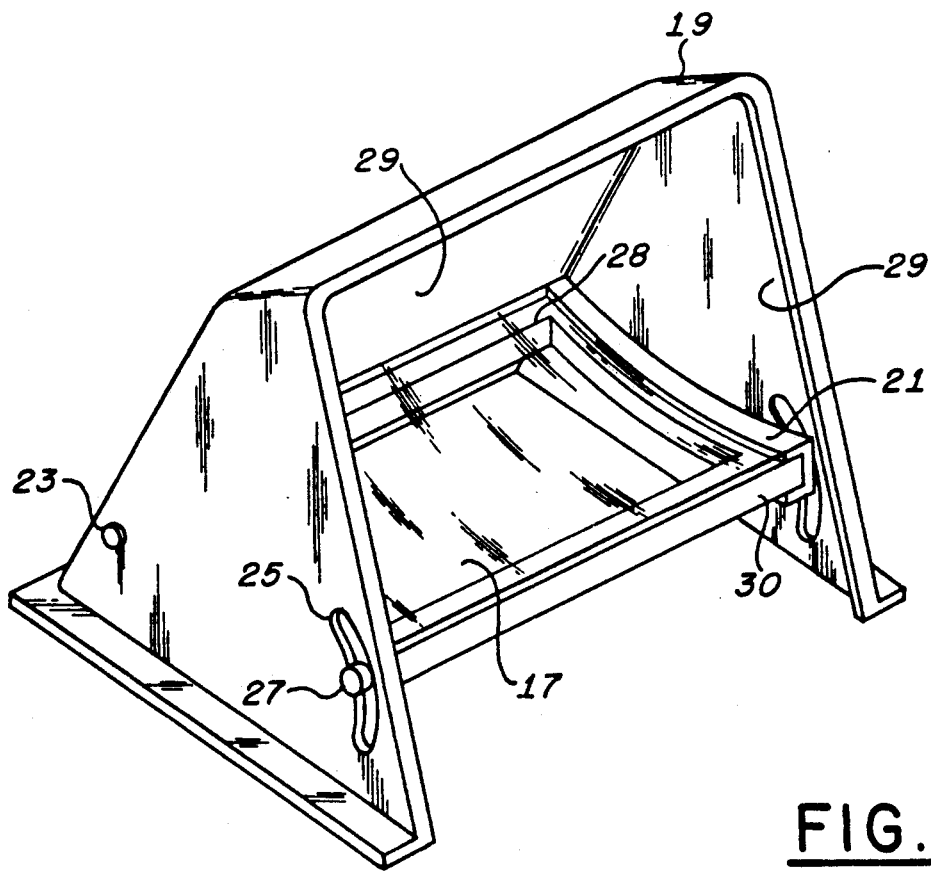
FIG. 2 is a representation of an embodiment of the invention.

Refer now to FIG. 2, wherein the glare reduction shield 10 is shown in greater detail. And wherein elements previously mentioned bear the previously assigned reference numerals. A significant degree of glare reduction is accomplished with a shade 19, having parallel side walls, which prevents a large percentage of the ambient light from reaching the display surface. Light not intercepted by the shade 19 is incident to the glare reduction plate 17 supported by a bracket 21 which pivots at one end about a pivot 23 to provide a height adjustment at the other end controlled by a slot 25 and held at the desired position by a locking arm 27. The glare reducing plate 17 and the bracket 21 are constructed to have a concave, positive slope configuration, yet to be described. Due to this concave, positive slope configuration, light reflected from the surface of the glare reducing plate 17 is directed to a light absorbent coating on the underside 29 of the shade 19.

A glare reducing plate 17 having a concave positive slope configuration in accordance with the invention may be constructed as an arc of a circle, which typically may have a radius of 14 inches (35.6 cm). This arcuate plate is generally positioned in the shade 19 with the rear edge 28 above the forward edge to establish a positive slope for a straight line that is in the order of 0.45. This straight line is parallel to the side walls of the shade 19 and passes through points on front and rear edges 30 and 28 of the glare reducing plate 17.

Figure 3A:
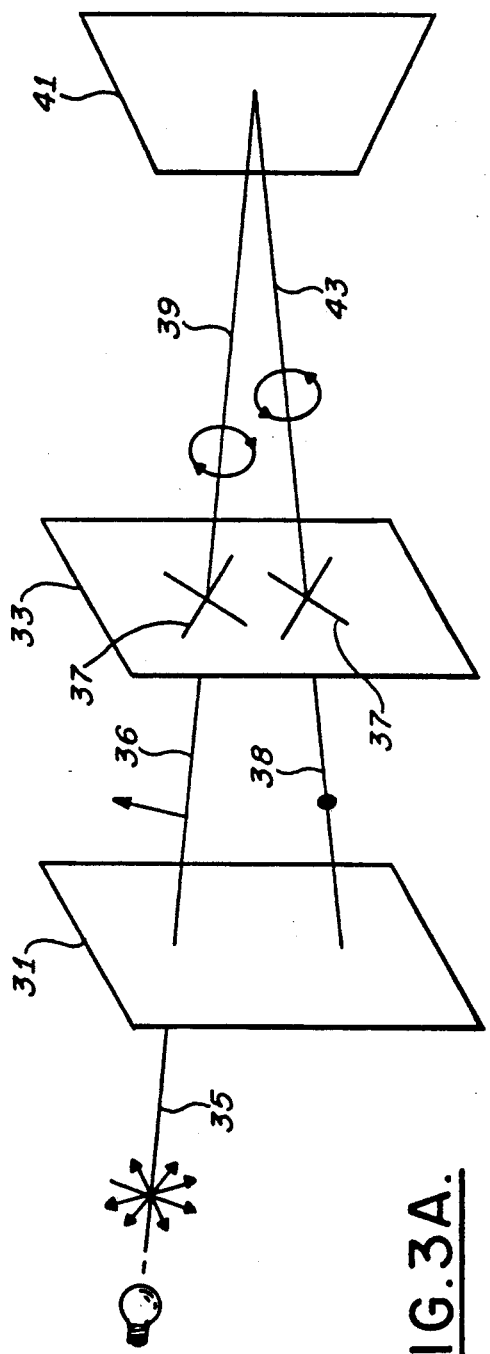
FIGS. 3A and 3B are ray diagrams useful in explaining an element of the invention.
Figure 3B:
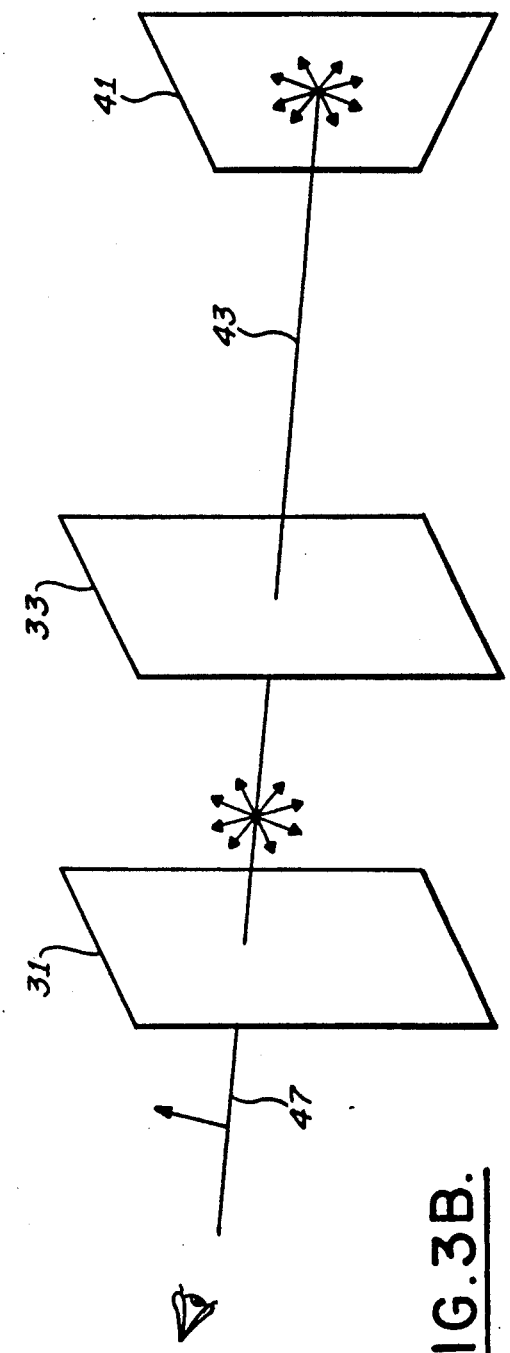

The glare reducing plate 17 comprises two elements, a linearly polarizing filter 31 and a quarter-wave plate 33. The linearly polarizing filter 31 is constructed to transmit a ray of light polarized at 45 degrees to the axis 37 of the quarter-wave plate 33. This linearly polarized beam exists a quarter-wave plate as a circularly polarized wave 329 having right hand rotation, though left hand rotation is equally acceptable. Upon reflection from a reflecting surface, the sense of rotation reverses, providing a ray 43 circularly polarized with left hand rotation. Upon transversing the quarter-wave plate 33, a ray 38 emerges linearly polarized at a 90 degree angle to the polarization of the incident ray 36. This perpendicular polarization of the reflected ray 38 is absorbed by the polarization filter 31. Referring now to FIG. 3B, an unpolarized light beam 43 originating from the reflecting surface 41, which may be a diplay screen, incident to the quarter-wave plate 33 emerges therefrom as a ray 45 of unpolarized light incident to the linearly polarizing filter 31 and emerges therefrom as a ray 47 with a linear polarization. In the manner described above, the glare reducing plate 17 significantly reduces glare from the surface of a display while permitting light emitted from the display to be transmitted to an Observer.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A glare reduction shield comprising:
   shade means, having parallel side walls, enclosing a predetermined volume for shading a stationary display surface area at a base of said volume; and
   glare reducing means coupled to said shade means and positioned at an adjustable height above said display surface area for reducing glare from said display surface area.

2. An apparatus in accordance with claim 1, wherein said glare reducing means has a concave, positive slope configuration.

3. An apparatus in accordance with claim 2, wherein said glare reducing means is arcuately shaped and positioned in said shade means to establish a positive slope for a line parallel to said parallel side walls and passing through a first point on a front edge of said glare reducing means and a second point on a rear edge of said glare reducing means.

4. An apparatus in accordance with claim 2, wherein said glare reducing means includes a circular polarizer.

5. An apparatus in accordance with claim 1, further including:
   means for pivotally mounting one edge of said front and rear edges of said glare reducing means to said shade means; and
   means for guiding an edge of said front and rear edgess opposite said one edge to selectable heights above said display surface area.

6. An apparatus in accordance with claim 5, further including means coupled to all interior surfaces of said shade means for absorbing light reflected from said glare reducing means.

7. An apparatus in accordance with claim 6, wherein said glare reducing means has a concave, positive slope configuration for directing light reflected from said glare reducing means to said light absorbing means.

8. An appartus in accordance with claim 7, wherein said glare reducing means includes a circular polarizer.

9. An apparatus in accordance with claim 8, wherein said glare reducing means is arcuately shaped and positioned in said shade means to establish a positive slope for a line parallel to said parallel side walls and passing through a first point on a front edge of said glare reducing means and a second point on a rear edge of said glare reducing means.

* * * * *